United States Patent [19]
Ke et al.

[11] Patent Number: 5,963,262
[45] Date of Patent: Oct. 5, 1999

[54] SYSTEM AND METHOD FOR SCALING IMAGES AND REDUCING FLICKER IN INTERLACED TELEVISION IMAGES CONVERTED FROM NON-INTERLACED COMPUTER GRAPHICS DATA

[75] Inventors: Ligang Ke; Juergen M. Lutz, both of Austin, Tex.

[73] Assignee: Cirrus Logic, Inc., Fremont, Calif.

[21] Appl. No.: 08/886,113

[22] Filed: Jun. 30, 1997

[51] Int. Cl.[6] .................................................. H04N 7/01
[52] U.S. Cl. ........................... 348/447; 348/910; 348/446
[58] Field of Search .................................. 348/446, 447, 348/910, 458, 627, 625, 607, 613

[56] References Cited

U.S. PATENT DOCUMENTS

| | | | |
|---|---|---|---|
| 4,377,821 | 3/1983 | Sautter et al. | 358/133 |
| 4,454,506 | 6/1984 | Netravali et al. | 340/728 |
| 4,620,225 | 10/1986 | Wendland et al. | 348/446 |
| 4,649,378 | 3/1987 | Johnson et al. | 340/728 |
| 4,740,842 | 4/1988 | Annegarn et al. | 358/160 |
| 4,799,105 | 1/1989 | Mitchell et al. | 358/160 |
| 4,825,289 | 4/1989 | Ohta | 358/167 |
| 4,924,315 | 5/1990 | Yamashita | 358/160 |
| 4,926,261 | 5/1990 | Matsumoto et al. | 358/167 |
| 4,947,251 | 8/1990 | Hentschel | 358/166 |
| 5,005,011 | 4/1991 | Perlman et al. | 340/728 |
| 5,008,752 | 4/1991 | Van Nostrand | 348/581 |
| 5,019,904 | 5/1991 | Campbell | 348/910 |
| 5,136,385 | 8/1992 | Campbell | 358/160 |
| 5,146,329 | 9/1992 | Flamm | 358/166 |
| 5,182,643 | 1/1993 | Futscher | 358/140 |
| 5,337,089 | 8/1994 | Fisch | 348/446 |
| 5,455,628 | 10/1995 | Bishop | 348/446 |
| 5,495,296 | 2/1996 | Dosho et al. | 348/571 |
| 5,510,843 | 4/1996 | Kene et al. | 348/446 |
| 5,534,936 | 7/1996 | Kim | 348/448 |
| 5,546,130 | 8/1996 | Hackett et al. | 348/910 |
| 5,602,599 | 2/1997 | Greggain | 348/581 |
| 5,619,226 | 4/1997 | Cahill, III | 345/132 |
| 5,781,241 | 7/1998 | Donovan | 348/446 |

FOREIGN PATENT DOCUMENTS

| | | | |
|---|---|---|---|
| 0 588 499 A2 | 3/1994 | European Pat. Off. | G09G 1/16 |
| 0 630 154 A2 | 12/1994 | European Pat. Off. | H04N 5/44 |
| 0 710 925 A2 | 5/1996 | European Pat. Off. | G06T 3/40 |
| WO96/35203 | 11/1996 | WIPO | G09G 1/16 |
| WO96/36037 | 11/1996 | WIPO | G09G 5/36 |

OTHER PUBLICATIONS

International Search Report (Dec. 4, 1998).

*Primary Examiner*—Victor R. Kostak
*Attorney, Agent, or Firm*—Brian W. Peterman; J.P. Violette

[57] ABSTRACT

A system and method for conversion of graphics from computer graphics formats to television formats is disclosed. More particularly, an improved scaling and flicker reduction system and method is disclosed for scaling personal computer (PC) graphics formats into different resolution television (TV) formats and for reducing flicker due to the conversion process of interlacing non-interlaced PC graphics to match interlaced TV formats. The scaling implementation reduces line buffer requirements by using a conditional scaling technique for converting graphics from a PC resolution format to a TV resolution format. The flicker reduction implementation provides a two-dimensional adaptive filter that selects between multiple filters so that different parts of an image may have different flicker reduction and different levels of trade off between flicker reduction and resolution. The system and method disclosed are more generally applicable to converting images from one resolution to another and to reducing flicker in images converted from a non-interlaced format to an interlaced format.

38 Claims, 8 Drawing Sheets

SYSTEM AND METHOD FOR SCALING IMAGES AND REDUCING FLICKER IN INTERLACED TELEVISION IMAGES CONVERTED FROM NON-INTERLACED COMPUTER GRAPHICS DATA

BACKGROUND OF THE INVENTION

1. Field of the Invention

The present invention relates to systems and methods for converting progressive scanned images, such as non-interlaced computer graphics RGB (red-green-blue) data, into signals that are compatible with interlaced formats, such as interlaced television input formats. More particularly, the present invention relates to systems and methods for scaling images in computer resolution formats into television resolution formats and for reducing flicker in interlaced television images converted from non-interlaced computer graphics data.

2. Description of Related Art

In the early years of personal computers (PCs), many PCs used televisions (TVs) as display devices. As resolution requirements for PCs increased, however, specialized monitors were developed for display of high resolution PC graphics. PC monitors and TVs became distinct electronic devices having distinct format standards with little connection.

Applications now exist where it is desirable for a PC to be capable of using a TV as a display device for computer graphics. One application for TV output signals is for use in business presentations where a large screen TV may be preferred to show PC graphics (with or without text) to a large audience. There is also a need for low-cost home-use PCs that may utilize a TV for displaying PC graphics. In addition, emerging new TV services, such as multi-media TV, interactive TV and internet services require TVs to display PC graphics. The divergence of PC graphics standards (e.g., VGA, SVGA, etc.) and TV standards (e.g. NTSC, PAL, SECAM, etc.), however, make displaying PC graphics on TVs rather complicated. Because of the difference in standards, it is necessary to process PC graphics data before it is encoded to a TV signal by regular TV encoders.

To make this conversion, PC graphics may need to be scaled so that the resolution of the PC graphics image will match the resolution used by the TV. Scaling is desirable so that little or no information is lost at the edge of the TV screen. For example, consider converting PC graphics in 640×480 VGA format (640 pixels horizontally across, 480 pixels vertically down) into a 64033 400 NTSC TV format. Unless the PC graphics image is scaled to the TV format resolution, only part of the PC graphics image will be visible on the TV screen. This result is unacceptable because needed information, such as icons or menus, may be out of the range of the TV screen and be unavailable to the user. Thus, it is desirable and typically necessary for graphics processing circuitry within a PC to be capable of scaling the PC graphics image to match a desired TV resolution format.

To convert PC graphics to a TV display format, it is also typically necessary to convert from a non-interlaced signal to an interlaced signal. This is so because PC graphics standards adopt a non-interlaced, progressive scan format, while TV standards adopt an interlaced scan format. This interlacing conversion, however, often creates flicker problems in the converted image. For example, PC graphics standards provide for non-interlaced graphics that may be refreshed at a relatively high refresh rate, such as 60 Hz or more, to guarantee no perceptible flicker. In contrast, many TV standards provide a much lower frame refresh rate, such as 30/25 Hz for the NTSC/PAL format. Further, the fact that typical PC graphics include high contrast vertical neighboring pixels (e.g., single-pixel horizontal lines or edges) may result in the lines or edges appearing in only one of the two fields after interlacing of the PC graphics. This leads to the lines or edges being refreshed only once per frame. Because NTSC/PAL operates at a frame rate of 30/25 Hz, the refresh rate for such single-pixel horizontal lines or edges may only be 30/25 Hz, which is not sufficient for the human eye to perceive them as flicker-free. In making interlacing conversions, therefore, it is desirable to implement flicker reduction to reduce the amount of flicker introduced through the non-interlaced to interlace conversion process.

Various prior scaling and flicker reduction techniques have been utilized. Prior scaling implementations have typically been to apply weighted averages to neighboring image pixels to scale the PC graphics image both vertically and horizontally to match the TV resolution format. Prior flicker reduction implementations have utilized a scan converter having frame storage capabilities. While this frame-based flicker reduction may produce high quality TV images, as well as have extra flexibility in its graphics interface requirements, it is not cost-efficient due to the large size required on a silicon device to provide frame storage. Flicker reduction implementations have also used methods that limit the graphics sources. Such methods, for example, may limit each display point on a line of an interlaced field to be vertically paired with the point on the vertically neighboring line of the next field. Other flicker reduction implementations have used low-pass filters to filter out vertical high frequency components of original graphics to generate relatively smooth vertical contrast between neighboring pixels. This low-pass filtering process may include line averaging or a similar technique. A fractional control coefficient has also been applied as a function of predetermined conditions of vertically adjacent pixel values to adjust the value provided by the low-pass filter.

Various disadvantages are associated with these prior scaling and flicker reduction implementations. For example, prior scaling implementations suffer from the disadvantage of requiring large silicon areas for the line buffers required to accomplish the scaling function. Prior flicker reduction implementations suffer from the disadvantage of being unable to adequately handle flicker in images having widely varying pixel conditions, such as mixed images that include text, continuous tone signals, and graphics. Furthermore, prior flicker reduction implementations do not account for horizontal and vertical pixel conditions within the image, which each may significantly affect flicker in a converted image.

What is needed is an improved scaling and flicker reduction implementation that is capable of scaling images from one resolution to another without requiring large silicon areas, that is capable of adequately handling flicker in mixed images, and that is capable of taking into account horizontal as well as vertical pixel conditions in reducing flicker.

SUMMARY OF THE INVENTION

In accordance with the present invention, system and related method for conversion of non-interlaced images to a different resolution interlaced format include a conditional scaling circuitry and a two-dimensional adaptive flicker reduction circuitry.

The conditional scaling system converts image data to a desired output resolution and includes a scaling block having at least two sets of selectable scaling coefficients defining a scaled output value and coefficient selection circuitry selecting one of the sets of selectable scaling coefficients depending upon at least one condition related to the pixel values. The flicker reduction system reduces flicker in non-interlaced images converted to interlaced images and includes a flicker reduction filter having at least two selectable filters with each filter providing a different frequency response for the flicker reduction filter and filter selection circuitry receiving image data representative of pixel values from at least two lines of the image and applying a filter selection signal to the flicker reduction filter to select one of the filters.

DESCRIPTION OF THE PREFERRED EMBODIMENTS

Figure 1A:
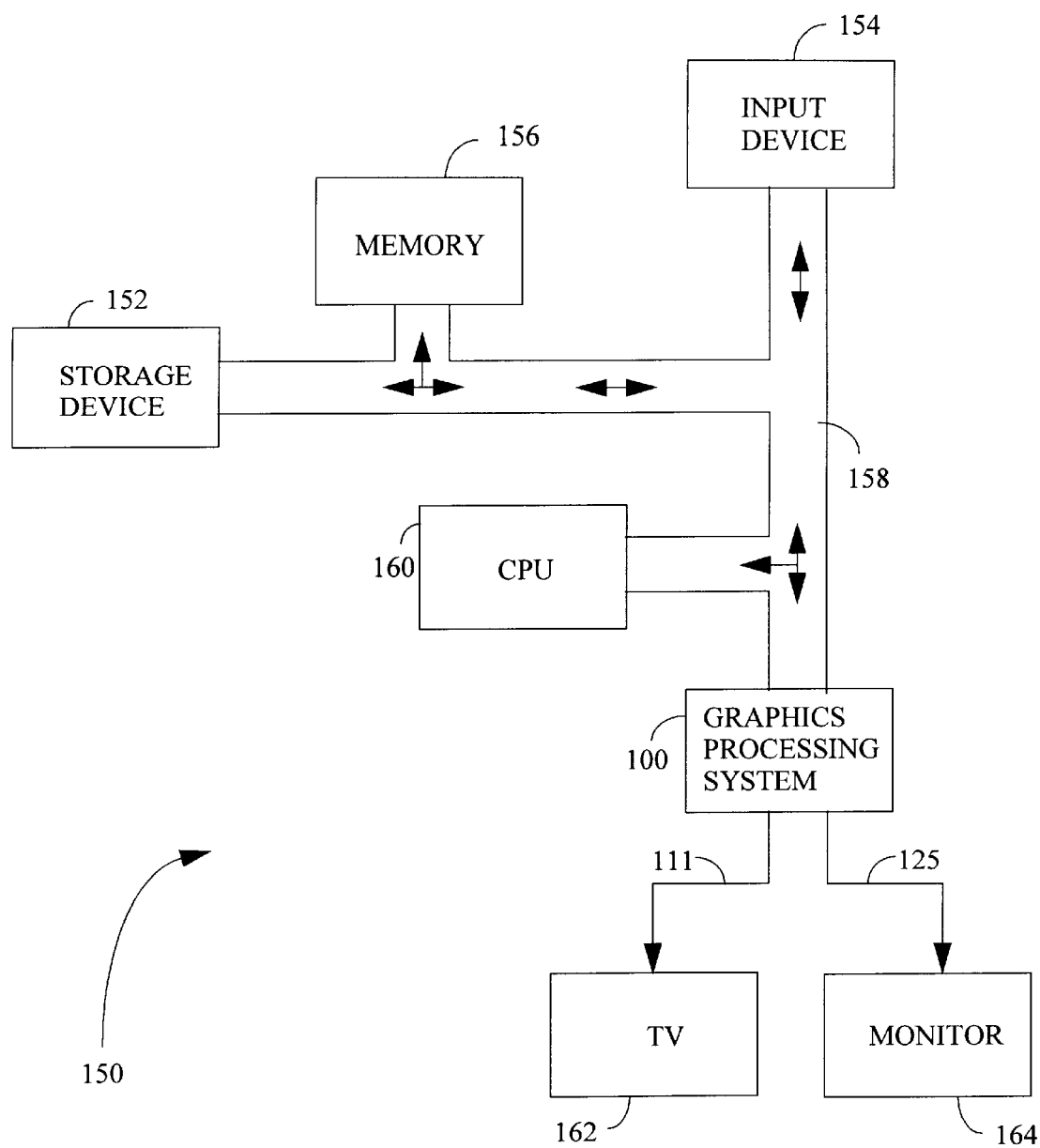
FIG. 1A is a block diagram of a personal computer (PC) system including a graphics is processing system according to the present invention.

FIG. 1A is a block diagram of a personal computer (PC) system 150 including a graphics processing system 100 according to the present invention. PC system 150 may include storage device 152 (e.g., hard disk, CDROM), memory 156 (e.g., random access memory), input device 154 (e.g., keyboard, mouse), and central processing unit (CPU) 160 (e.g., microprocessor) communicating with each other and graphics processing system 100 through internal bus 158. Graphics processing system 100 may provide television output data 111 to television (TV) 162 and/or monitor output data 125 to monitor 164. Although the present invention is particularly advantageous for converting personal computer (PC) graphics formats into television (TV) formats, the present invention is also applicable where images in one format require vertical or horizontal scaling to match the resolution in another format and where images in a non-interlaced format require conversion into an interlaced format.

Figure 1B:
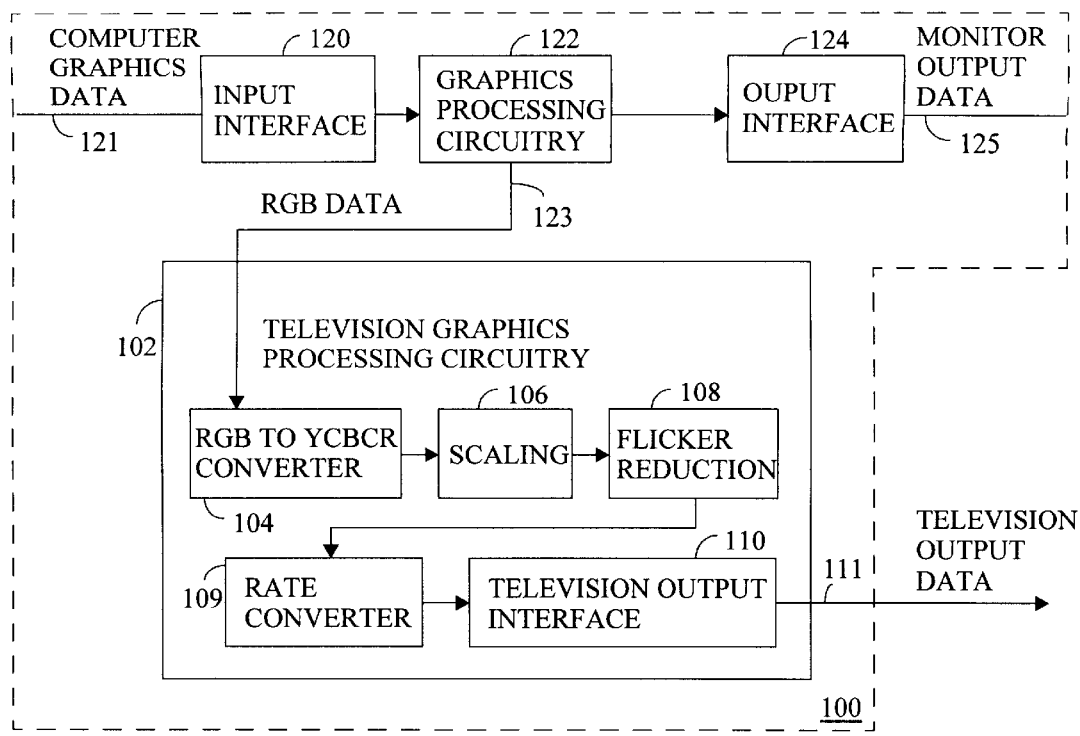
FIG. 1B is a block diagram of a graphics processing system including television graphics processing circuitry that has a scaling block and a flicker reduction block according to the present invention.

FIG. 1B is a block diagram of a graphics processing system 100 including TV graphics processing circuitry 102. Graphics processing system 100 may include an input interface 120, graphics processing circuitry 122, and output interface 124 for taking computer graphics data 121 from internal bus 158 of PC system 150 and providing monitor output data 125 to monitor 164 in a desired output format (e.g., VGA, SVGA, etc.). TV graphics processing circuitry 102 for providing output data 111 to the encoder input of television 162 in a desired format (e.g., NTSC/PAL). The TV graphics processing circuitry 102 may have a RGB to YCbCr converter 104, a scaling block 106, a flicker reduction block 108, a rate converter 109, and a television output interface 110. RGB data 123 may be provided by graphics processing circuitry 122.

PC graphics formats typically adopt non-interlaced RGB (red-green-blue) data (with or without gamma correction) as the data format. This non-interlaced RGB data is provided to a PC monitor and allows display of high resolution images that may or may not include text. To provide this same information in a format that a standard TV input decoder will understand, a computer system will typically first convert the non-interlaced RGB data to luma and chroma color space components on a pixel-by-pixel basis. The luma component (Y) represents the brightness of the pixel. The chroma component (CbCr) represents the blue color difference (Cb) of the pixel and the red color difference (Cr) of the pixel. Thus, the RGB data is converted into a brightness and two color difference signals (YCbCr). Computer systems may also further convert the resulting 4:4:4 YCbCr data into a 4:2:2 YCbCr data (other n1:n2:n3 ratios of data per component may also be used), before any scaling or flicker reduction is applied to the graphics information. Although the description of the present invention is directed to YCbCr graphics data with a bit width of 8 bits as an input to the scaling and flicker reduction implementations, it is possible for other data configurations and bit sizes to be used with the present invention.

Figure 2A:
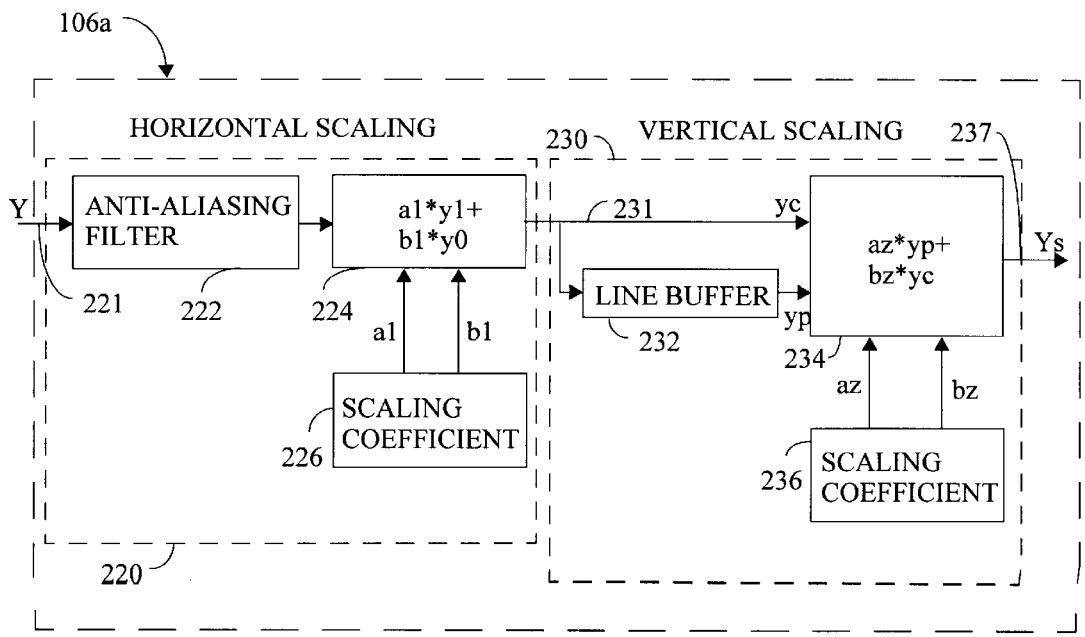
FIG. 2A is a block diagram of an embodiment of a scaling implementation for a brightness component of PC graphics data according to the present invention.
Figure 2B:
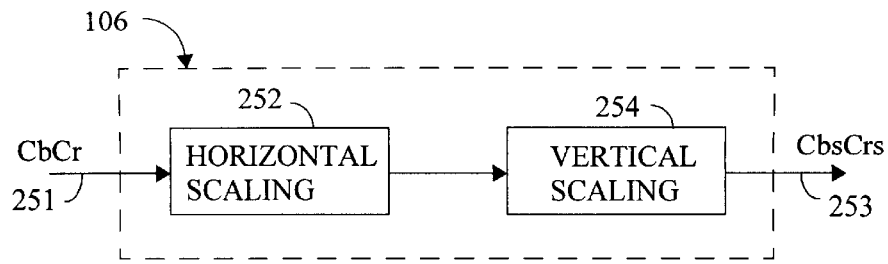
FIG. 2B is a block diagram of an embodiment of a scaling implementation for a chroma component of PC graphics data according to the present invention.

FIG. 2A and FIG. 2B are block diagrams of luma (Y) scaling circuitry 106a and chroma (CbCr) scaling block 106b, respectively. Before scaling is applied, single multiplexed YCbCr graphics data is first separated into luma (brightness) and chroma (color) signals. Scaling is then performed on the luma and chroma signals separately.

In luma (Y) scaling circuitry 106a, non-interlaced PC graphics luma (Y) values 221 are fed in line by line, as would be done by a normal raster-scan, into horizontal scaling circuitry 220. For horizontal scaling, a conventional anti-aliasing filter 222 may be applied before horizontal scaling block 224, if desired. Horizontal scaling block 224 applies coefficients (a1, b1) from scaling coefficient block 226 to horizontally adjacent pixel values (y1, y0) to form a horizontally scaled output 231 (yc) according to the formula yc=a1*y1+b1*y0. The value "y0" represents the pixel value currently being processed and provided as an output, and the value "y1" represents the previous horizontal pixel value in the image. It is noted that y1 and y0 will not be available at the edge of the image; therefore, a "black" luma level may be used for such unavailable values.

A weighted average implementation may be used for horizontal scaling circuitry 220, if horizontal scaling is needed. For example, TABLE 1 provides coefficient values that may be used for a1 and b1 for a 640-to-560 scaling, which is a 7/8 ratio, as well as the LMVD control signal that identifies valid/invalid values for rate converter 109.

TABLE 1

Horizontal Luma Scaling Coefficients

| Pixel Number (mod 8) | a1 | b1 | LMVD |
|---|---|---|---|
| 0 | 0 | 1 | 0 |
| 1 | 1 | 0 | 1 |
| 2 | 14/16 | 2/16 | 1 |
| 3 | 11/16 | 5/16 | 1 |
| 4 | 9/16 | 7/16 | 1 |
| 5 | 7/16 | 9/16 | 1 |
| 6 | 5/16 | 11/16 | 1 |
| 7 | 2/16 | 14/16 | 1 |

In vertical scaling circuitry 230, horizontally scaled output 231 (yc) is applied to a line buffer 232, which stores graphics data from the preceding line. Line buffer 232 provides a vertically adjacent pixel value (yp) to vertical scaling block 234. Vertical scaling block 234 applies coefficients (a2, b2) from scaling coefficient block 236 to vertically adjacent pixel values (yc, yp) to form a vertically and horizontally scaled output 237 (Ys) according to the formula Ys=a2*yc+b2*yp. The value "yc" refers to the pixel value currently being processed to provide scaled output 237 (Ys), whereas the value "yp" refers to the vertically adjacent pixel value from the previous line. It is noted that yc and yp will not be available at the edge of the image; therefore, a "black" luma level may be used for such unavailable values.

To reduce line storage requirements, yp may be stored in line buffer 232 as the 5 MSBs (most significant bits) of its original 8-bit value (e.g., line buffer of 5×640 bits), and yc may be the current 8-bit luma value. The 5-bit storage size for line buffer 232 provides enough precision to avoid introduction of artifacts into the resulting image, and is chosen to be 5 bits instead of 8 bits to reduce the silicon area required to implement this line buffer. (It is noted that the bit sizes, e.g. 5-bit value stored in line buffer 232 and the 8-bit current value, may be smaller or greater in other designs.) The conditions and the weighing coefficients, as well as the corresponding LMVD signal, are listed in TABLE 2 below.

TABLE 2

Vertical Luma Scaling Coefficients

| \|yc* − yp\| < 2 | Line Number (mod 6) | a2 | b2 | LMVD |
|---|---|---|---|---|
| 0 | 0 | 0 | 1 | 0 |
|  | 1 | 1 | 0 | 1 |
|  | 2 | 13/16 | 3/16 | 1 |
|  | 3 | 10/16 | 6/16 | 1 |
|  | 4 | 6/16 | 10/16 | 1 |
|  | 5 | 3/16 | 13/16 | 1 |

TABLE 2-continued

Vertical Luma Scaling Coefficients

| \|yc* − yp\| < 2 | Line Number (mod 6) | a2 | b2 | LMVD |
|---|---|---|---|---|
| 1 | 0 | 0 | 1 | 0 |
|  | 1 | 0 | 1 | 1 |
|  | 2 | 0 | 1 | 1 |
|  | 3 | 0 | 1 | 1 |
|  | 4 | 0 | 1 | 1 |
|  | 5 | 0 | 1 | 1 |

In TABLE 2, "yc*" is 5 MSBs of the current 8-bit luma value yc, while "yp" is the 5 MSBs of the vertically adjacent luma value stored in the line buffer. The column labeled "|yc*−yp|<2" represents a condition that provides coefficients (a2, b2) from the row labeled "1" when satisfied, and that provides coefficients (a2, b2) from the row labeled "0" when not satisfied. The column labeled "line number" represents the vertical coordinate (i.e., 1 of 6 lines) of a pixel in the active graphics output. The column labeled "LMVD" represents a control signal that identifies which 5 lines out of every 6 lines of PC graphics data will be used. The coefficients for line 0 are dummy coefficients because the output of line 0 is disabled by the "0" in the LMVD signal column when the flicker reduction block 108 reads data from the scaling block 106.

The conditional scaling implementation according to the present invention reduces line buffer requirements, and thereby reduces silicon area requirements, without causing noticeable artifacts to appear in the resulting image. This conditional scaling scheme distinguishes between cases where there are two large contrast luma values (e.g., condition=0) and where there are two close luma values (e.g., condition=1). When the condition is not satisfied, which indicates the case of two large contrast luma values, linear interpolation between the two luma values using the coefficients in TABLE 2, using a 5-bit line buffer holding the 5 MSBs of the vertically adjacent luma value, and using the 8-bit value of the current luma value will not cause a noticeable artifact due to masking effects. Linear interpolation is used to minimize the loss of information in such a way that all data contributes as a weighted average to the output so that no single line will be totally disappear at the output. When the condition is satisfied, which indicates two very close luma values, the coefficients in TABLE 2 provide that the current 8-bit luma value is directly passed to the output without using the relatively inaccurate 5-bit data stored in the line buffer (i.e., b2=1 and a2=0). If the inaccurate 5-bit data were used, an artifact would likely be noticeable due to little masking effects with such smoothly changing data.

Although only conditional vertical scaling is set forth above, horizontal scaling could also be implemented as a conditional weighted average as opposed to a simple weighted average using the coefficients shown in TABLE 1. However, because line buffer storage is not usually a problem with horizontal scaling implementations, the conditional weighted average implementation of the present invention may not provide any meaningful space savings on the silicon used for fabrication.

FIG. 2B is a block diagram of an embodiment of chroma scaling block 106*b*, including horizontal scaling block 252 and vertical scaling block 254. Non-interlaced graphics chroma values (CbCr) 251 are fed in to the chroma scaling block 106*b* line by line at an appropriate rate as would be done by a normal raster-scan. Chroma scaling block 106b provides scaled chroma values (CbsCrs) 253 as an output. The horizontal scaling block 252 may perform weighted averaging of neighboring pixels horizontally (corresponding to two horizontal pixels that are one pixel apart due to the chroma subsampling) as implemented by luma horizontal scaling block 220. If the horizontal resolutions are the same, horizontal chroma scaling is not necessary.

Vertical chroma scaling block 254 may perform a non-conditional weighted average, or a conditional weighted average, of vertically neighboring chroma values. To save line buffer space, the vertical line selection circuitry 254 of the chroma scaling block 106b may also simply select five out of every six vertical lines to scale frames vertically from 480 lines to 400 lines. This technique provides adequate results because human eyes are less sensitive to the chroma component than the luma component of PC graphics data. Selecting five out of every six lines is equivalent to a procedure that directly outputs all lines while leaving a controlling signal to indicate whether the lines are valid or not. As a result, no line buffer is required, further reducing silicon area requirements. TABLE 3 below shows a CMVD control signal that may be used to provide this 5 out of 6 vertical line selection. A "1" indicates that the line is valid, while a "0" indicates that the line is invalid.

TABLE 3

Vertical Chroma Scaling Control Signals

| Line Number (mod 6) | CMVD+ (even frames) | CMVD+ (odd frames) | CMVD |
|---|---|---|---|
| 0 | 0 | 0 | 0 |
| 1 | 1 | 0 | 1 |
| 2 | 0 | 1 | 1 |
| 3 | 1 | 0 | 1 |
| 4 | 0 | 1 | 1 |
| 5 | 1 | 0 | 1 |
| 6 | 0 | 0 | 0 |
| 7 | 0 | 1 | 1 |
| 8 | 1 | 0 | 1 |
| 9 | 0 | 1 | 1 |
| 10 | 1 | 0 | 1 |
| 11 | 0 | 1 | 1 |

In TABLE 3, the CMVD+ control signal is used to indicate if the vertical output lines are valid or not valid and incorporates a mechanism of interlacing for even and odd fields. In operation, the CMVD+ signal disables those odd/even lines in the set of lines enabled for even/odd frame scaling.

Rate converter 109 utilizes the valid/invalid control signals (LMVD, CMVD) in TABLES 1–3 to provide appropriate lines to television output interface 110 so that the television output data 111 is provided at the desired output line rate. When no scaling is involved, the TV graphics output line rate from the PC is 31.469/31.250 KHz for a NTSC/PAL TV format. When scaling from 480 vertical lines to 400 vertical lines is involved, the TV graphics output line rate from the PC may be increased to 37.763/37.500 KHz for NTSC/PAL. This 1.2 (6/5) factor increase in the line rate is done to provide a graphics output that produces six lines in a period of five lines of TV operation (actually 2.5 lines of TV operation after interlacing). Because the scaling described below will generate five lines of TV graphics output from every six lines of PC graphics input in performing its 480-to-400 vertical scaling, five lines (2.5 lines after interlacing) of TV graphics output data will be available in a period of five lines (actually 2.5 lines with interlace) of TV operation.

It is desirable to implement scaling of the computer graphics data prior to implementing flicker reduction, as shown in FIG. 1B, although this order is not required. Because PC graphics tend not to follow typical statistical distributions for images, such as most TV graphics do, implementing the scaling process first tends not to decrease vertical correlation in the resulting image. Decreased vertical correlation will contribute to flicker after PC graphics data is interlaced. In fact, vertical scaling may even increase vertical correlation for PC graphics in some circumstances, for example, a single horizontal line may become two less contrasted lines after linear interpolation and subsampling. The effectiveness of subsequent flicker reduction, which attempts to increase vertical correlation, will be no worse than if no scaling were implemented at all. If flicker reduction is implemented before scaling, the scaling process may decrease vertical correlation, removing some increased vertical correlation provided by the flicker reduction implementation. As a result, the effectiveness of the flicker reduction may be reduced, resulting in flicker that is worse with scaling than without scaling. It is noted, however, that in some cases it may be desirable to implement flicker reduction before scaling. For example, where a large scaling factor is being used and maintaining resolution is more important than producing a flicker-free image, implementing scaling last will likely produce a more desirable result.

Figure 3A:
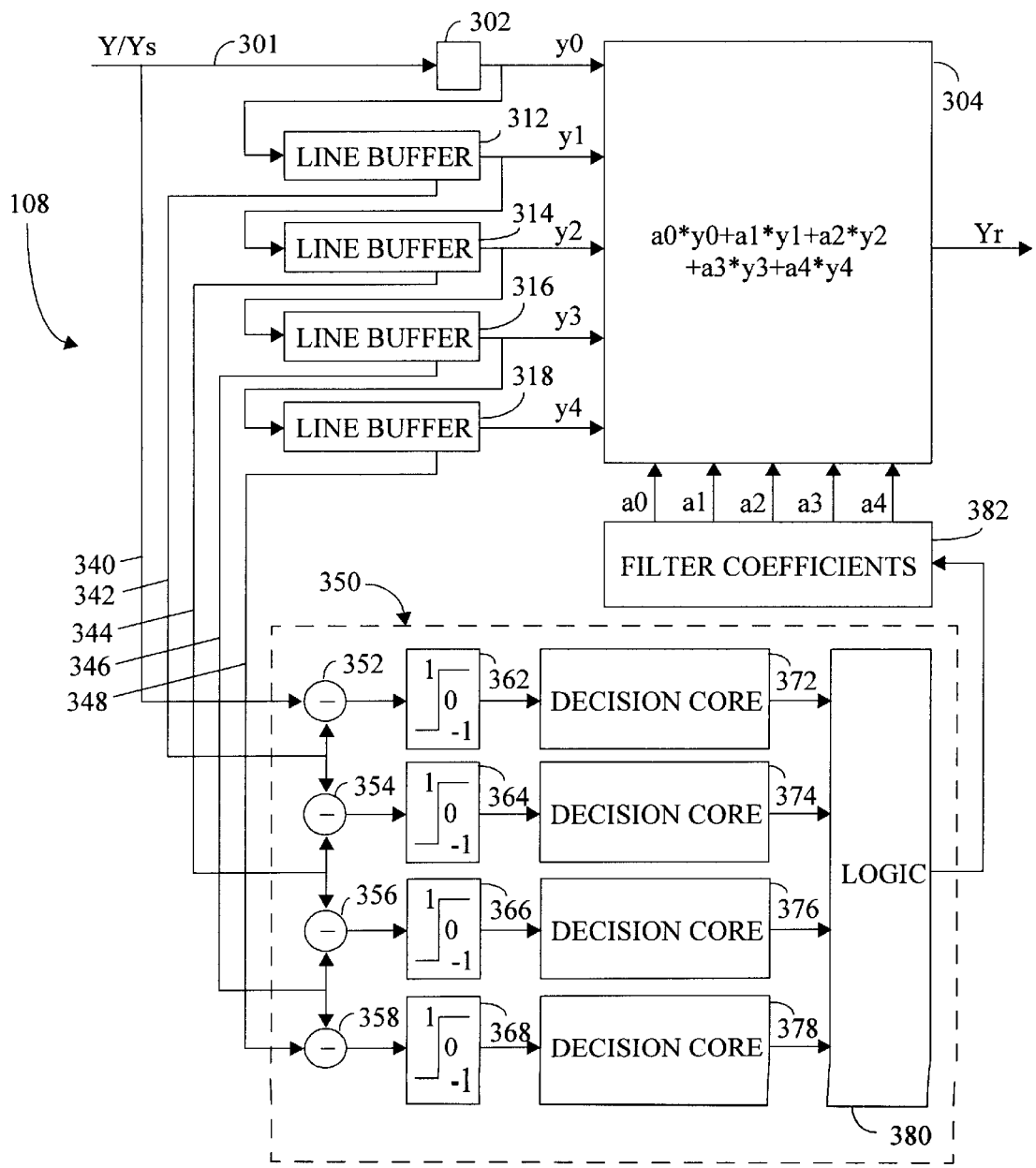
FIG. 3A is a block diagram of an embodiment of a flicker reduction implementation according to the present invention.

FIG. 3A is a block diagram of an embodiment of a flicker reduction implementation 108 according to the present invention. Due to the fact that flicker is mainly caused by high vertical frequency of the luma (Y) component of YCbCr data, flicker reduction is generally performed only on the luma (Y) component of PC graphics data. The scaled (Ys) or unscaled (Y) signal is provided to the flicker reduction filter 304 through input buffer 302 as input signal 301. The four line buffers 312, 314, 316 and 318 together store values from the four lines previous to the current line values, which is represented by the y0 signal, and provide signals y1, y2, y3, and y4 to flicker reduction filter 304. Line buffer 312 receives the y0 signal and provides the y1 signal as an output. Line buffer 314 in turn receives the y1 signal and provides the y2 signal as an output. Line buffer 316 receives the y2 signal and provides the y3 signal as an output. Line buffer 318 receives the y3 signal and provides the y4 signal as an output. Flicker reduction filter 304 applies coefficients (a0, a1, a2, a3, a4) from filter coefficient block 382 to provide a flicker-reduced reduced output signal (Yr) that follows the equation $Yr = a0*y0 + a1*y1 + a2*y2 + a3*y3 + a4*y4$.

The value "y2" represents the pixel value currently being provided as an output of flicker reduction filter 304. The values "y3" and "y4" represent vertically adjacent pixel values from the first and second previous lines with respect to the line containing y2 values. The values "y1" and "y0" represent vertically adjacent pixel values from the first and second subsequent lines with respect to the line containing y2 values. It is noted that not all of the y0, y1, y2, y3, and y4 values will be available for use at the edge of an image; therefore, the unavailable values are set to a "black" luma level because most displays have a black background. It is also noted that the image pixel data output (Yr) of flicker reduction filter 304 is delayed with respect to the image pixel data input (Ys).

Filter selection block 350 receives Y/Ys PC graphics data signal 340, a signal 342 from line buffer 312, a signal 344 from line buffer 314, a signal 346 from line buffer 316, and a signal 348 from line buffer 318. Subtracter 352 is connected to data signal 340 and signal 342. Subtracter 354 is connected to signal 342 and signal 344. Subtracter 356 is connected to signal 344 and signal 346. Subtracter 358 is connected to signal 346 and signal 348. Depending upon the difference between the values of these luma signals determined by subtracters 352, 354, 356 and 358, limiters 362, 364, 366 and 368 provide a logic level "1", "0" or "−1" to decision cores 372, 374, 376 and 378. In turn, these decision cores provide outputs that are interpreted by logic block 380 to provide a selection signal to filter coefficient block 382 that chooses the desired coefficients to be applied by flicker reduction filter 304.

Flicker reduction filter 304 is an adaptive filter that may be changed depending upon the two-dimensional image information being processing by the filter selection block 350. For example, flicker reduction filter 304 may be implemented with a FIR (finite impulse response) filter having selectable coefficients. TABLE 4 below lists example coefficients that effectively generate four FIR filters. The direct passing mode for constant or smooth changing areas is shown as the fourth filter.

TABLE 4

| Coefficient | Filter Coefficients | | | |
| --- | --- | --- | --- | --- |
|  | Filter 1 | Filter 2 | Filter 3 | Filter 4 |
| a0 | 3/64 | 0 | −6/64 | 0 |
| a1 | 16/64 | 1/4 | 16/64 | 0 |
| a2 | 26/64 | 1/2 | 44/64 | 1 |
| a3 | 16164 | 1/4 | 16/64 | 0 |
| a4 | 3/64 | 0 | −6/64 | 0 |

Figure 3B:
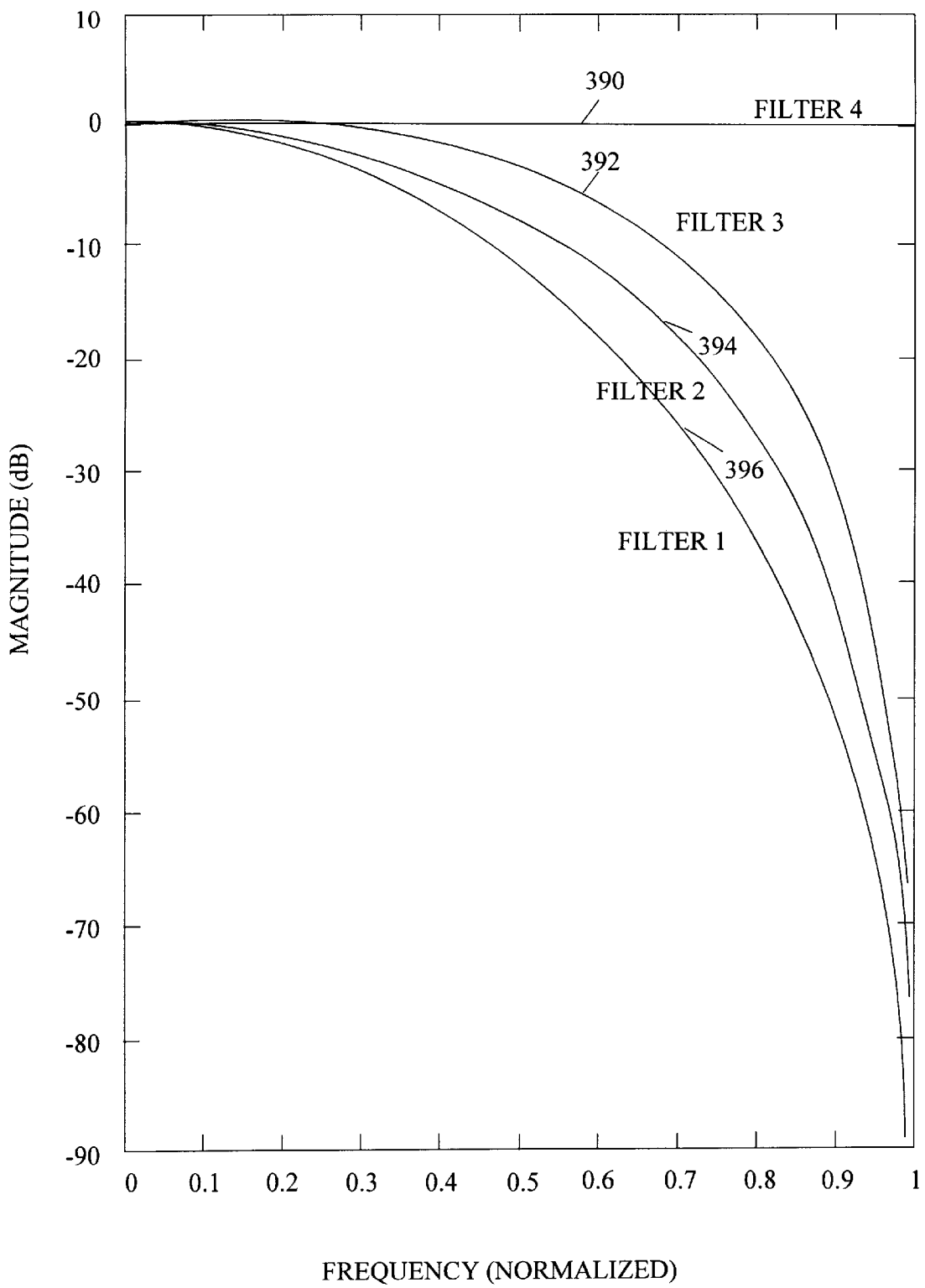
FIG. 3B is a frequency response diagram of four filters that may be utilized in a flicker reduction implementation according to the present invention.

FIG. 3B depicts example frequency responses associated with separate FIR filters generated by the coefficients in TABLE 4. In FIG. 3b, response 390 is associated with filter 4. Response 392 is associated with filter 2. Response 394 is associated with filter 3. Response 396 is associated with filter 1. The vertical axis of the frequency response chart in FIG. 3B represents magnitude (dB), while the horizontal axis represents normalized line frequency.

The flicker reduction implementation 108 in FIG. 3A includes the filter selection block 350 that adaptively selects the appropriate coefficients to chose one of the four filters according to the nature of the image area. Each pair of the four subtracters (352, 354, 356, 358) and the four limiters (362, 364, 366, 368) act together to provide an output to the four decision cores (372, 374, 376, 378), as follows: (a) a "1" if the subtraction produces a large positive number (e.g., difference $\geq 32$), (b) a "−1" if the subtraction produces a small negative number (e.g., difference $\leq -32$), or (c) a "0" if the subtraction produces a number close to 0 (e.g., 32>difference >−32). Each of the four decision cores (372, 374, 376, 378) then determines the length of consecutive "1"s or "−1"s, which corresponds to the length of horizontal lines/edges, before the logic circuitry 380 determines the filter to be chosen. Each decision core may be implemented with the following logic:

1. First counter, where x is the current input, xp is the previous input, and C1 is contents of the counter:
   1.1 If x=0 and xp=0, set C1=0.
   1.2 If x=0 and xp=0, set C1=0.
   1.3 If x=1 and xp=−1, or x=−1 and xp=1, set C1=1.
   1.4 If x=1 or −1 and xp=0, set C1=1.
   1.5 If x=1 or −1 and x=xp and C1<N (e.g. 12), set C1=C1+1.
   1.6 If x=1 or −1 and x=xp and C1=N (e.g., 12), set C1=C1.

2. An array of N memory addresses (address 1 to N).
   2.1 Initialize the memory array to 0.
   2.2 If 1.2, 1.3, or 1.6 happens, write C1 (before setting) to the memory at address C1.
   2.3 To all memory addresses that are not affected by 2.2, write 0 to the memory at address 1 and content at address AD to memory at address AD+1, where AD<N.

3. Second counter and a memory, where x is the contents of the memory array of 2 at address N, C2 is content of the second counter, and M is the content of the memory:
   3.1 If x≠0, set C2=x, set M=x.
   3.2 If x=0, C2≠0, set C2=C2 −1.
   3.3 If x=0, C2=0, set C2=0.

The logic circuitry 380 receives the outputs of the four decision cores (372, 374, 376, 378) and determines which set of coefficients should be selected and provided by filter coefficient block 382 to flicker reduction filter 304. Logic circuitry 380 may make this selection as follows:

1. If all four decision blocks have C2=0, choose the fourth filter.
2. If for any one of the decision blocks C2≠0 and M=12, choose the first filter.
3. If at least two of the Ms from the decision blocks are equal where $3 \leq M<12$, and for each of those decisions blocks C2≠0, choose the second filter.
4. Otherwise, choose the third filter.

The adaptive flicker reduction implementation of the present invention, therefore, includes decision making circuitry that distinguishes patterns of certain lines or edges from typical text, and typical text from areas of constant values or smooth change. Wherever a pattern associated with a definite line/edge is detected, the filter best for eliminating severe flicker will be used to eliminate the severe flicker (e.g., filter 1). If text is determined, one of the two filters best for maintaining high resolution as well as eliminating the less-severe flicker will be selected (e.g., filter 2 or filter 3). If a constant area or a smooth changing area is detected, a direct passing mode will be selected (e.g., filter 4). In this way, a better overall quality image is achieved by choosing different flicker reduction filters based upon a two-dimensional adaptive mechanism. It is noted with reference to TABLE 4 that the primary component of the resulting signal flicker-reduced signal Yr is provided by coefficient a2 as applied to signal y2, and that filter 4 passes through the value of y2. According to the present invention, therefore, a two-dimensional window is utilized around the values being processed and output to select the appropriate filter for that portion of the image. In other words, to achieve higher overall quality to meet both flicker-free and high resolution requirements in the same image, such as mixed images including text, continuous tone signals, and graphics, the present invention provides a flicker reduction implementation that adaptively changes the characteristic of its flicker reduction filter.

Besides vertical pixel pattern conditions, horizontal pixel pattern conditions also may play a major role in flicker. For example, flicker may be severe in an area of a single pixel horizontal line, while the flicker may not be severe in an area of text. The adaptive process is based on decision circuitry that looks at a two-dimensional window that includes the currently processed pixel and evaluates the vicinity of that pixel to make an appropriate selection from a plurality of flicker filters on a per-pixel basis. (It is noted that this adaptive process could also be implemented to make adaptive selections for groups of pixels or on a sub-pixel basis.) Such a two-dimensional adaptive scheme recognizes that a typical graphics image is non-homogeneous in terms of its flicker distribution. The present invention improves image quality by selecting the flicker reduction filter from multiple selectable filters that will provide the best resulting resolution-to-flicker reduction trade off in each portion of the image.

Figure 5:
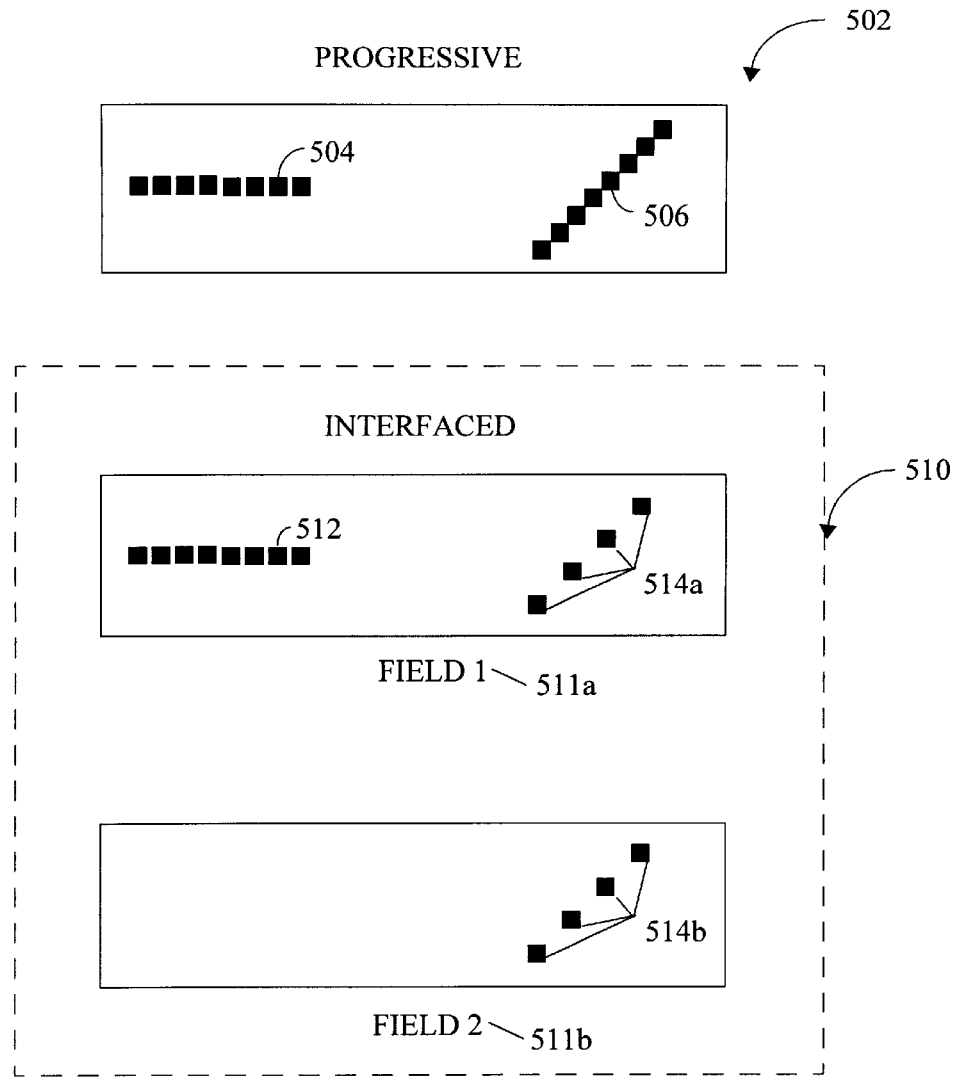
FIG. 5 is a diagram of example pixel configurations in a progressive scanned image format and an interlaced image format.

FIG. 5 depicts example pixel configurations in a progressive scan format 502 and an interlaced format 510. In the progressive scan format 502, a horizontal line 504 and a diagonal line 506 are depicted in a single frame. When converted to the interlaced format 510, the horizontal line 504 will go to horizontal line 512 in the first field 511a without any pixels from the single-pixel horizontal line 504 going into the second field 511b. When converted to interlaced format 510, diagonal line 506 goes into pixels 514a in the first field 511a and pixels 514b in the second field 511b. By providing a two-dimensional window for filter selection, therefore, the present invention is capable of adapting to both vertical and horizontal pixel conditions when selecting filter parameters and greatly improves flicker reduction for a wider range of pixel conditions.

To improve flicker reduction, the two-dimensional window, as provided by the example logic circuitry 380 and decision cores 372, 374, 376, and 378 described above, is a sliding two-dimensional window. The number of horizontal pixels within the two-dimensional window on either side of the pixel currently being processed and output slides or adjusts horizontally as the image is processed. The two-dimensional window may be at any position in the horizontal direction as long as the currently processed pixel is within or on the window boundary. Although the two-dimensional window is centered in the vertical direction around output y2, it could be made sliding in the vertical direction if desired. The desirability of this sliding window is described with respect to FIGS. 6A and 6B.

Figure 6A:
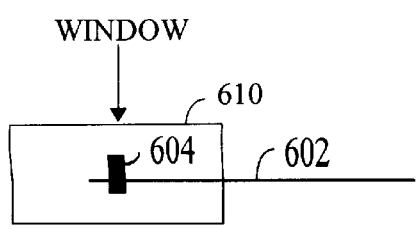
FIG. 6A is a diagram of a non-sliding two-dimensional window with respect to a pixel in a horizontal line according to the present invention.

FIG. 6A is a diagram of a non-sliding two-dimensional window 610 with respect to a horizontal line 602, according to the present invention. The horizontal line 602 includes the pixel 604 that is currently being processed and output by the flicker reduction filter 304. Pixel 604 is, for example, the second pixel of horizontal line 602. Using a centered or non-sliding two-dimensional window 610, the horizontal line 602 within window 610 may be too short to meet the requirements for using filter 1, described above, and filter 2 would be used.

Figure 6B:
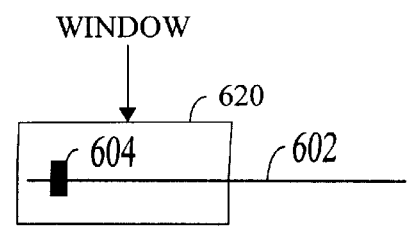
FIG. 6B is a diagram of a sliding two-dimensional window with respect to a pixel in a horizontal line according to the present invention.

FIG. 6B is a diagram of a sliding two-dimensional window 620 with respect to a horizontal line 604, according to the present invention. Sliding two-dimensional window 620 shifts to the left to include enough of horizontal line 602 that the requirements for using filter 1 would be met. Similarly, when processing pixels at the end of horizontal line 602, the sliding window 620 shifts to the right. As a result, by utilizing sliding window 620, the entire horizontal line 602 will be processed using filter 1, which is desirable. In contrast, utilizing non-sliding or centered two-dimensional window 610, horizontal line 602 would be processed as three different conditions with left and right portions being filtered with filter 2 and the center portion being filtered with filter 1.

Figure 3C:
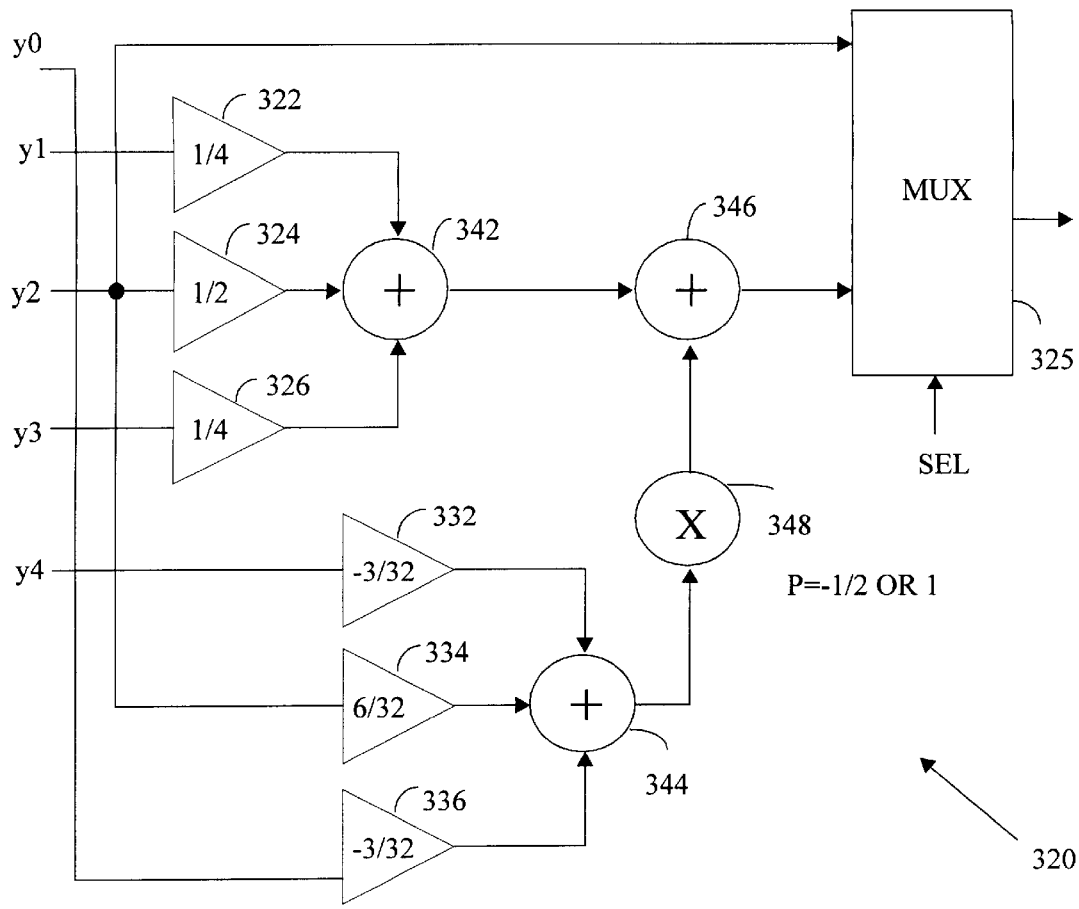
FIG. 3C is a block diagram of an embodiment of a filter design that may be utilized in a flicker reduction implementation according to the present invention.

Referring now to FIG. 3C, an embodiment of a filter 320 for flicker reduction filter 304 is depicted. This embodiment provides the four 5-tap FIR flicker reduction filters selectable by the coefficients listed in TABLE 4. Adder 342 receives signal y1 through ¼ divider 322, receives signal y2 through ½ divider 324, and receives signal y3 through ¼ divider 326. Adder 344 receives input signal y0 through −3/32 divider 336, receives input signal y2 through 6/32 divider 334, and receives input signal y4 through −3/32 divider 332. The output of adder 344 is applied to multiplier 348 which applies a factor "p" of either −½ or 1. Adder 346 receives the output of adder 342 and multiplier 348. Multiplexer (MUX) 325 receives input signal y2, receives the output from adder 346, and receives a select (SEL) signal. The output of MUX 325 follows the formula for flicker reduction filter 304 described above. In filter 320, when SEL=0, the coefficients of filter 4 in TABLE 4 will be selected. If SEL=1 and p=−½, the coefficients of filter 1 in TABLE 4 will be selected. If SEL=1 and p=1, the coefficients of filter 3 in TABLE 4 will be selected. Finally, if SEL=1 and p=0, the coefficients of filter 2 in TABLE 4 will be selected filter 3 will be selected. This high tap filter design allows for improved flicker reduction results for various flicker conditions.

One concern in designing a flicker reduction implementation is minimizing line storage (e.g., smaller bit size or smaller number of line buffers) to minimize the silicon area required for line storage. One choice for line storage is to assign each cell of the four line buffers (actually 4 lines plus N pixels) in FIG. 3A to 8-bit accuracy. Although this line storage assignment will work, line storage size is significant in affecting the silicon area of flicker reduction implementation, and this line storage assignment tends to take up large amounts of silicon area. It is desirable, therefore, to minimize line storage while maintaining the quality of the output (e.g., unchanged or unnoticeable).

This bit-saving mechanism contemplated by the present invention recognizes, and takes advantage of, the fact that inaccuracy (or error) in a rapidly changing area of an image is less noticeable because of masking affects. This masking affect makes it possible to save bits by only keeping several MSBs of some original data. Although this less accurate data is adequate in rapidly changing areas where masking is high, it is typically inadequate in smooth changing areas where masking affects are low.

Because the adaptive flicker reduction implementation depicted in FIG. 3A uses the fourth filter to directly pass data in smooth changing areas of the graphics, only the directly passed data must be kept highly accurate. As a result, the line storage configuration and related subtraction circuitry may be selected to save silicon area without adversely affecting the resulting image quality. For example, input buffer 302 for the current luma value may be 8×N (e.g., N=12) bits. The line buffer 312 may be 4×640 bits. The line buffer 314 may be 7×640 bits. The line buffer 316 may be 4×640 bits. And the line buffer 318 may be 3×640 bits. It is noted that the bit numbers may be smaller or greater depending upon the design chosen to be implemented.

With this line storage configuration, where y4, y3, y2, y1 are inputs from the fourth, third, second, first previous lines with respect to y0, which is the input from the current line, the subtracters (352, 354, 356, 358) and the limiters (362, 364, 366, 368) of the filter selection block 350 may work as follows:

1. If y4−y3>2 (where y4 and y3 are 4-bit values with y4 transformed from original 3-bit value by appending 0 at LSB), the first limiter gives 1. If y4−y3<−2, it gives −1. Otherwise, it gives 0.

2. If y3−y2>16 (where y3, y2 are 7-bit values with y3 transformed from original 4-bit value by appending 0s at 3 LSBs), the second limiter give 1. If y3−y2<−16, it gives −1. Otherwise, it gives 0.

3. If y2−y1>16 (where y2, y1 are 7-bit values with y1 transformed from original 4-bit value by appending 0s at 3LSBs), the third limiter gives 1. If y2−y1<−16, it gives −1. Otherwise, it gives 0.

4. If y1−y0>32 (where y1, y0 are 8-bit values with y1 transformed from original 4-bit value by appending 0s at 4 LSBs), the fourth limiter gives 1. If y1−y0<32, it gives −1. Otherwise, it gives 0.

This line storage configuration does not suffer from an introduction of error due to the y1 line storage being 4 bits and the y2 line storage being 7 bits. To avoid moving the 7-bit line data into the 4-bit line data without introducing error, the present invention takes advantage of interlacing requirements by only guaranteeing half of the valid output lines.

Figure 3D:
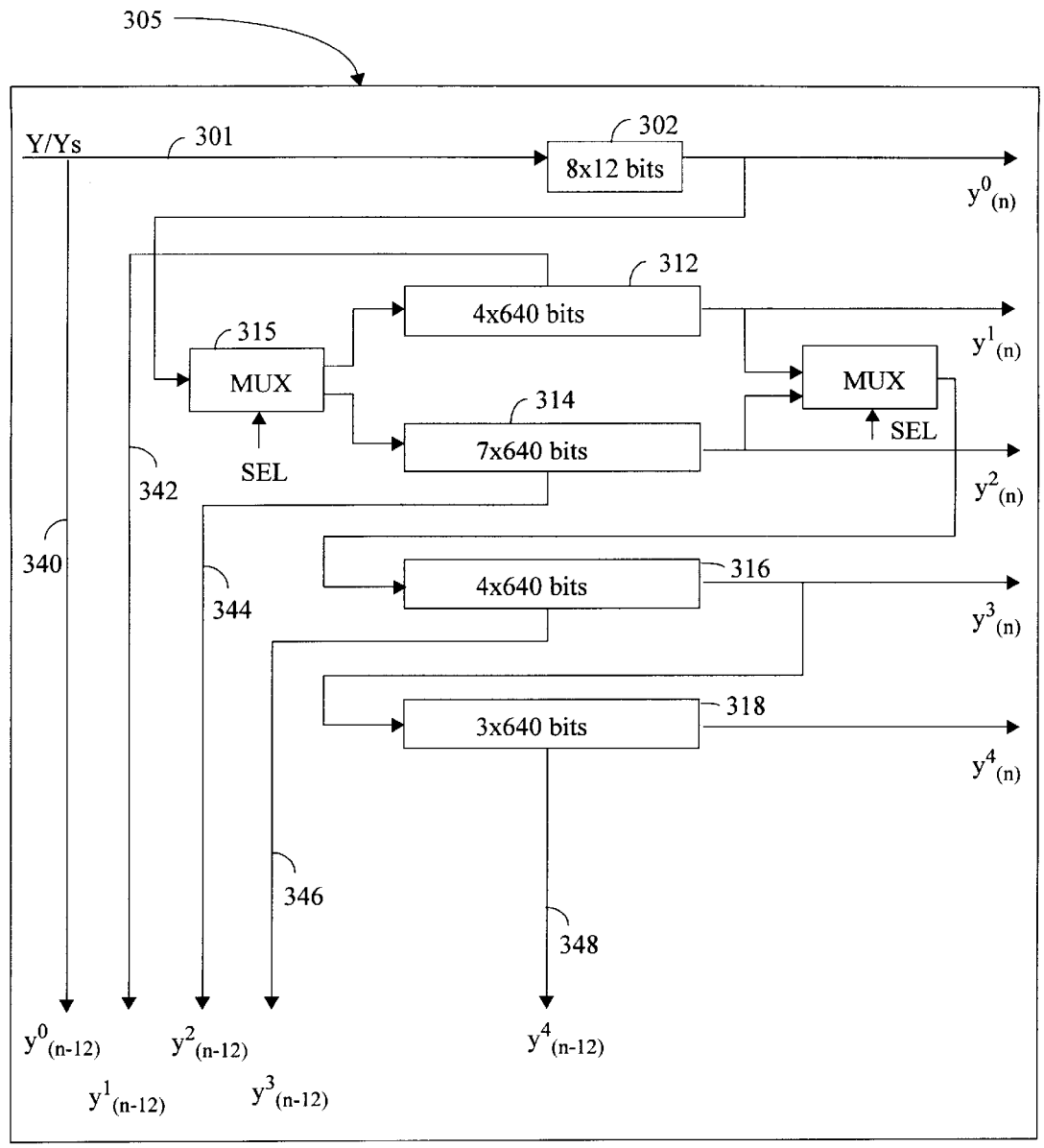
FIG. 3D is a block diagram of an embodiment of a line buffer implementation that may be used to reduce the line buffer requirements in a flicker reduction implementation according to the present invention.

FIG. 3D is a block diagram of a line buffer implementation 305 according to the present invention that reduces line buffer requirements by taking advantage of the these interlacing requirements. Current input buffer 302 is 8×12 bits. Line buffer 312 is 4×640 bits. Line buffer 314 is 7×640 bits. Line buffer 316 is 4×640 bits. And line buffer 318 is 3×640 bits. A multiplexer (MUX) 315 is connected between the output of current input buffer 302 and line buffers 312 and 314. In turn, another MUX 317 receives the output of line buffers 312 and 314 and an input to line buffer 316. When SEL=0, line buffer 312 inputs and outputs data, while line buffer 314 holds its previous data. When SEL=1, line buffer 314 inputs and outputs data, while line buffer 312 holds its previous data. For even frames, which transfer to even fields after interlacing, SEL=1 for even current value (Y/Ys) lines, and SEL=0 for odd current value (Y/Ys) lines. Conversely, for odd frames, which transfer to odd fields after interlacing, SEL=0 for even current value (Y/Ys) lines, and SEL=1 for odd current value (Y/Ys) lines. This technique provides for the appropriate line values to be in the appropriate line buffers at the valid line timing (i.e., even lines for even frames and odd lines for odd frames).

FIG. 3D also shows timing differences between the output signals (y0, y1, y2, y3 and y4) of line buffer implementation 305 and the correlating input signals (340, 342, 344, 346 and 348) that are provided to filter selection block 350. The designation "n" refers to signals being applied at a reference time, and the designation "n−12" refers to a signals being applied at an earlier time by 12 clock cycles. This timing difference takes into account the time required for the filter selection circuitry 350 to provide output signals to filter coefficient block 382, so that the filter selected for flicker reduction filter 304 will be appropriate for the portion of the image currently being processed. These timing difference may be modified and designed for the particular implementation desired.

This line-buffer-saving mechanism benefits from the fact that not all frame output from the flicker reduction algorithm are necessary. Because flicker reduced PC graphics frames must be interlaced for proper TV operation, odd/even lines in the even/odd frames are actually discarded during the non-interlace to interlace conversion. As long as valid output is provided at the even/odd lines of the even/odd frames, the accuracy of outputs on invalid odd/even lines of the even/odd frames does not matter.

Figure 4B:
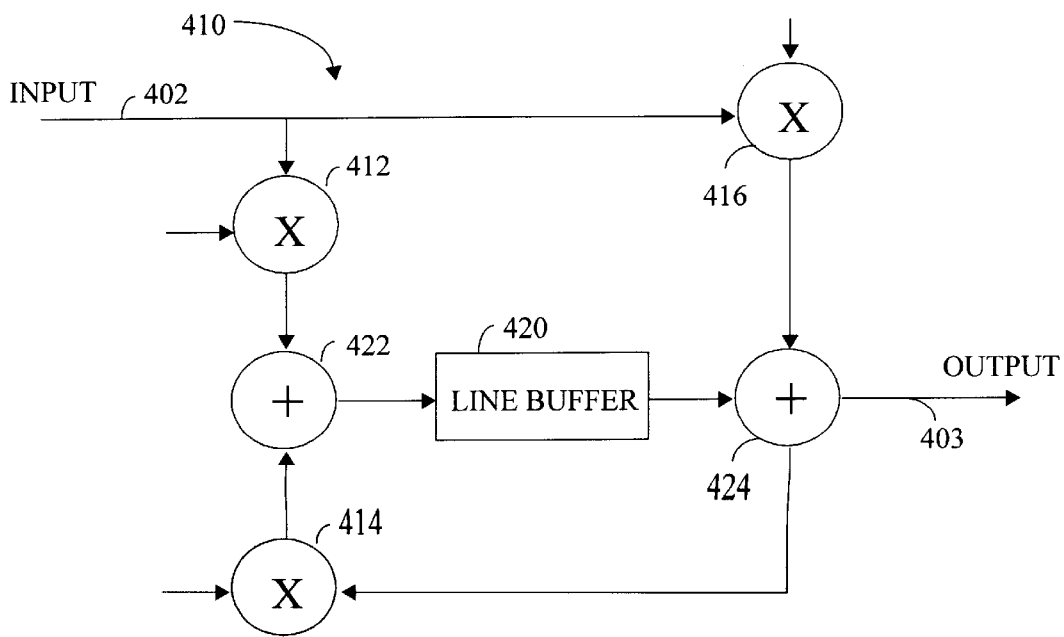
FIG. 4B is a block diagram of a base filter design that may be utilized to reduce the line buffer requirements in a flicker reduction implementation according to the present invention.
Figure 4A:
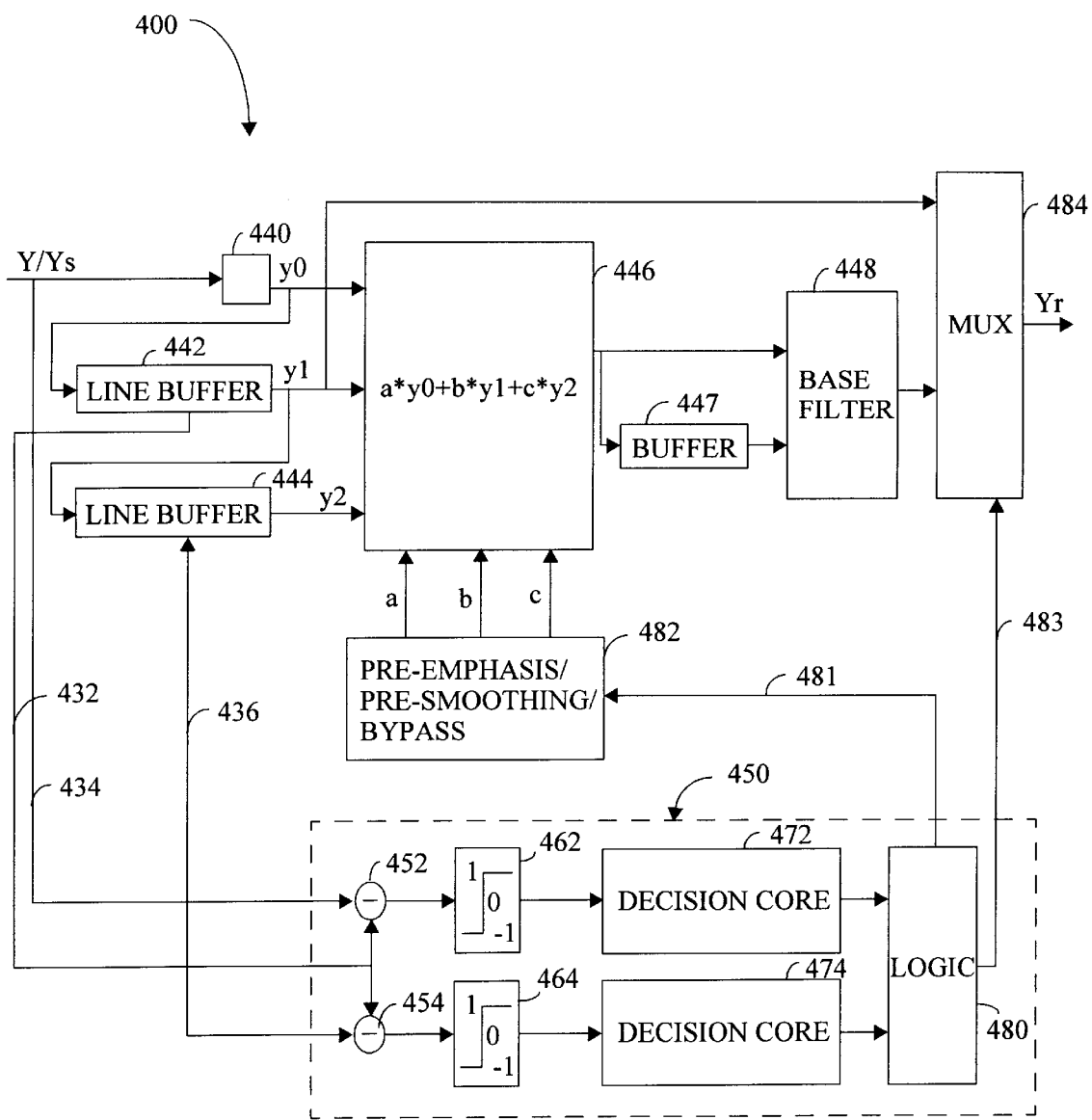
FIG. 4A is block diagram of an alternative embodiment of a flicker reduction implementation that reduces the line buffer requirements according to the present invention.

FIG. 4A is a diagram an alternative flicker reduction implementation 400 of a line-buffer-saving design according to the present invention. Instead of storing values from individual lines in the line buffers, this alternative implementation stores values for some lines that are only partial sums of products of values from individual lines (filtering can be regarded as sum of products of coefficients and inputs). To do this, the first 5-tap filter depicted in FIG. 3A may be broken into a 3-tap FIR low-pass filter called "pre-smoothing", and a 3-tap FIR low-pass filter called "base filter." The second 5-tap filter is broken into a 3-tap FIR high-pass filter called "pre-emphasis", and the same 3-tap FIR low-pass base filter. With a similar adaptive decision circuitry discussed above, the buffer-saving adaptive flicker reduction design chooses either the pre-smoothing or the pre-emphasis filter, or bypass both the pre-smoothing and the pre-emphasis filters, before applying the signals to the base filter. With an addition of a bypass mode, the four filters described with respect to FIG. 3A may be realized.

Flicker reduction filter 446 receives signal input y0 from current input buffer 440, receives signal y1 from line buffer 442 for the first previous line with respect to the y0 line, receives signal y2 from line buffer 444 for the second previous line with respect to the y0 line, and receives coefficients (a, b, c) from filter coefficient block 482 to provide an output represented by the formula output =a*y0+ b*y1+c*y2. This output is provided to buffer 447 and to base filter 448. Base filter 448 also receives an output from buffer 447, and in turn provides an output to multiplexer (MUX) 484. MUX 484 receives this output and the signal y1 from the line buffer 442, and provides a flicker-reduced output Yr depending upon a control signal 483 received from logic circuitry 480.

Flicker reduction implementation 400 also includes a coefficient selection circuitry 450, which includes subtracters 452 and 454, limiters 462 and 464, decision cores 472 and 474 and logic circuitry 480. Subtracter 452 receives a scaled or unscaled input (Y/Ys) 434 and an output 432 from line buffer 442. Subtracter 454 receives an output 432 from line buffer 442 and an output 436 from line buffer 444. Coefficient selection circuitry 450 provides a signal 481 to filter coefficient block 482, which provides appropriate coefficients (a, b, c) depending upon which filter has been selected, i.e., pre-emphasis, pre-smoothing, or none (bypass). The base filter 448 may be applied unless the control signal 483 indicates that MUX 484 should directly pass the contents of the y1 line buffer. TABLE 5 lists the filter coefficients (a, b, c) in the form of pre-smoothing filter, pre-emphasis filter, and base filter.

TABLE 5

| Filter Coefficients for Line-Buffer Saving Implementation | | | |
| --- | --- | --- | --- |
| Coefficients | Pre-smoothing | Pre-emphasis | Base |
| a | 3/16 | −6/16 | 1/4 |
| b | 10/16 | 28/16 | 2/4 |
| c | 3/16 | −6/16 | 1/4 |

By implementing the filter in two stages with flicker reduction filter 446 and base filter 448, the flicker reduction implementation 400 provides a 5-tap filter with four different filter choices. In the flicker reduction implementation 400 in FIG. 4A, the line buffers at the front end may be set to 8×12 bits for buffer 440, set to 7×640 bits for buffer 442, and set to 4×640 buffer 444. The four filter choices are as follows: (1) pre-smoothing+base, (2) base alone, (3) pre-emphasis+base, and (4) none. These four choices are analogous the to filter 1, filter 2, filter 3, and filter 4 as depicted with respect to the frequency response chart in FIG. 3B and represented by the coefficients in TABLE 4. It is noted that this line-buffer saving implementation may be used to implement an n-tap vertical filter using only n−2 line buffers for storage, instead of solutions of n−1 line buffers, for applications of non-interlaced to interlaced flicker reduction filter implementations.

Referring to FIG. 4B, an embodiment of a filter 410 is depicted that may be used for line buffer 447 and base filter 448 in the line-buffer saving implementation 400 of FIG. 4A to reduce line buffer requirements. Input 402 is provided to multiplier 412 and multiplier 416. Adder 422 receives the output of multiplier 412 and the output of multiplier 414. Line buffer 420 receives the output from adder 422. Adder 424 receives the output from line buffer 420, receives the output from multiplier 416, provides an input to multiplier 414, and provides an overall base filter output 403. Multiplier 412 has a factor of "b". Multiplier 414 has a factor of "c". And multiplier 416 has a factor of "a". TABLE 6 below provides a chart of the multipliers depending upon whether the line number is "0" or "1".

TABLE 6

| | Base Filter Multipliers | | |
|---|---|---|---|
| Line Number (mod 2) | a | b | c |
| 0 | 1/4 | 1 | 0 |
| 1 | 1/4 | 1/2 | 1/4 |

Instead of keeping two previous lines in two different line buffers all of the time, as would be the case for a straight forward implementation of line buffer 447 and base filter 448 in FIG. 4A, filter 410 uses the partial sum of products stored as a single 8-bit value in buffer 420 during odd/even line periods of even/odd frames. The 8-bit value may represent both the negative and out of range positive input from the high-pass pre-emphasis filter. As a result, several LSBs of the original signal inputs are discarded, although the specific number of bits may be smaller or greater. By utilizing this filter design in FIG. 4B, only one line buffer is required instead of two line buffers.

What is claimed is:

1. A scaling and flicker reduction system for conversion of non-interlaced images to a different resolution interlaced format, comprising:
   conditional scaling circuitry conditionally applying a scaling factor to each pixel within an image dependent upon pixel conditions including each said pixel; and
   adaptive flicker reduction circuitry receiving scaled image data from said scaling circuitry and utilizing a two-dimensional window around each pixel within said scaled image data to select one of a plurality of flicker reduction filters for each said pixel depending upon pixel conditions within said two-dimensional window.

2. A flicker reduction system for reducing flicker in non-interlaced images converted to interlaced images, comprising:
   a flicker reduction filter receiving image data representative of pixel values within a single image, said flicker reduction filter having at least two selectable filters with each filter providing a different frequency response for said flicker reduction filter; and
   filter selection circuitry receiving image data representative of pixel values from at least two lines within said single image and having a filter selection signal as an output, said filter selection signal being dependent upon an analysis of pixel values from at least two lines of said single image and being applied to said flicker reduction filter to adaptively select from among said at least two selectable filters to process said image data within said single image;
   wherein said at least two filters include a first filter for portions of an image having sharp changes between adjacent pixel values, and a second filter for portions of an image having smooth changes between adjacent pixel values.

3. The flicker reduction system of claim 2, wherein said filter selection circuitry utilizes horizontal and vertical pixel conditions within a two-dimensional window around a currently processed pixel to provide a two-dimensional adaptive filter selection.

4. The flicker reduction system of claim 3, wherein said two-dimensional window is not centered around said currently processed pixel.

5. The flicker reduction system of claim 4, wherein said two-dimensional window is a horizontally sliding two-dimensional window.

6. The flicker reduction system of claim 3, further comprising a current buffer storing pixel values from a line currently being input, and at least one line buffer storing pixel values from previous lines, said current buffer and said at least one line buffer providing said image data representative of pixel values from at least two lines to said flicker reduction filter and to said filter selection circuitry.

7. The flicker reduction system of claim 6, wherein said filter selection circuitry requires a propagation time period to produce said filter selection signal, and wherein said flicker reduction filter receives said image data in a time delayed manner to account for said propagation time.

8. The flicker reduction system of claim 2, wherein said image data comprises non-interlaced computer graphics data.

9. The flicker reduction system of claim 8, wherein said non-interlaced computer graphics data is a luma (Y) component of YCbCr data converted from RGB graphics data.

10. A flicker reduction system for reducing flicker in non-interlaced images converted to interlaced images, comprising:
    a flicker reduction filter receiving image data representative of pixel values from at least two lines of an image, said flicker reduction filter having at least two selectable filters with each filter providing a different frequency response for said flicker reduction filter; and
    filter selection circuitry receiving image data representative of pixel values from at least two lines of said image and having a filter selection signal as an output, said filter selection signal being dependent upon said image data and being applied to said flicker reduction filter to select one of said filters;
    wherein said filter selection circuitry provides said filter selection signal on a per-pixel basis to adaptively select a set of filter parameters on a per-pixel basis.

11. The flicker reduction system of claim 10, wherein said flicker reduction filter is a 5-tap FIR filter having four selectable sets of filter coefficients to provide four different selectable filters with differing frequency responses.

12. The flicker reduction system of claim 11, wherein one of said sets of filter coefficients is a pass-through filter.

13. The flicker reduction system of claim 10, wherein said flicker reduction filter comprises a 3-tap FIR filter having three selectable sets of filter coefficients and a base FIR filter coupled to said 3-tap FIR filter.

14. A method for reducing flicker in non-interlaced images converted to interlaced images, comprising:
    receiving image data representative of pixel values within a single image;
    providing a flicker reduction filter having at least two selectable filters with each filter providing a different frequency response for said flicker reduction filter, wherein said at least two filters include a first filter for portions of an image having sharp changes between adjacent pixel values, and a second filter for portions of an image having smooth changes between adjacent pixel values;

adaptively selecting from among said at least two selectable filters based upon an analysis of pixel values from at least two lines of said single image; and processing said image data within said single image with said flicker reduction filter to produce output pixel data that is dependent upon said adaptive filter selection.

15. A method for reducing flicker in non-interlaced images converted to interlaced images, comprising:

receiving image data representative of pixel values from at least two lines of an image;

providing a flicker reduction filter having at least two selectable filters with each filter providing a different frequency response for said flicker reduction filter; and selecting one of said at least two selectable filters based upon a comparison of said pixel values;

wherein said providing step comprises providing a flicker reduction filter having four sets of selectable filter parameters to provide four selectable filters.

16. The method of claim 15, wherein said selecting step comprises:

comparing a vertically adjacent pixel pair from a second subsequent line and a first subsequent line;

storing a value corresponding to a result of said comparison;

comparing a vertically adjacent pixel pair from said first subsequent line and a currently processed line;

storing a value corresponding to a result of said comparison;

comparing a vertically adjacent pixel pair from said currently processed line and a first previous line;

storing a value corresponding to a result of said comparison;

comparing a vertically adjacent pixel pair from said first previous line and a second previous line;

storing a value corresponding to a result of said comparison;

repeating said comparing and said storing steps for a number of pixels horizontally across said image; and choosing one of said four sets of selectable filter parameters based upon said comparisons and said stored values.

17. The method of claim 14, wherein said selecting step includes utilizing a two-dimensional window around a currently processed pixel to select one of said at least two selectable filters.

18. A scaling system for converting image data to a desired output resolution, comprising:

a scaling block having pixel values for an image as an input and at least two sets of selectable scaling coefficients defining scaled output values, said at least two sets of selectable scaling coefficients comprising a first set that provides a linear interpolation of pixel values and a second set that provides a duplication of pixel values; and coefficient selection circuitry selecting from among said at least two sets of selectable scaling coefficients for said pixel values within said image depending upon a difference between values for at least two adjacent of said pixel values;

wherein said first set of linear interpolation coefficients are selected if said difference is higher than a threshold amount and said second set of pixel duplication coefficients are selected if said difference is lower than a threshold amount.

19. The scaling system of claim 18, wherein said condition is related to pixel values that are vertically adjacent pixel values.

20. The scaling system of claim 18, further comprising a line buffer storing previous line pixel values and providing said previous line pixel values to said scaling block.

21. The scaling system of claim 18, wherein said condition is a difference between said vertically adjacent pixel values.

22. The scaling system of claim 21, having a first and a second set of selectable scaling coefficients, said first set of scaling coefficients being applied by said scaling block if said difference is greater than a predetermined value, and said second set of scaling coefficients being applied otherwise.

23. The scaling system of claim 18, wherein said coefficient selection circuitry is operable on a per-pixel basis to select one of said two sets of selectable scaling coefficients.

24. The scaling system of claim 19, wherein said vertically adjacent pixel values comprise a current pixel value, which is currently being processed, and a pixel in a previous line to said current pixel value within said image.

25. The scaling system of claim 24, wherein said previous line is a first previous line to said current pixel value within said image.

26. A scaling system for converting image data to a desired output resolution, comprising:

a scaling block having pixel values as an input and at least two sets of selectable scaling coefficients defining a scaled output value;

coefficient selection circuitry selecting one of said at least two sets of selectable scaling coefficients depending upon at least one condition related to said pixel values; and wherein said image data is computer graphics data and said desired output resolution is based upon a television input format.

27. The scaling system of claim 26, wherein said computer graphics data is a luma (Y) component of YCbCr computer graphics data converted from RGB computer graphics data.

28. A method for scaling image data to a desired output resolution, comprising: receiving pixel values for an image;

providing a scaling block having at least two sets of selectable scaling coefficients, said at least two sets of selectable scaling coefficients comprising a first set that provides a linear interpolation of pixel values and a second set that provides a duplication of pixel values;

analyzing said pixel values;

selecting from among said at least two sets of selectable scaling coefficients for said pixel values depending upon a difference between values for at least two adjacent of said pixel values;

selecting said first set of linear interpolation coefficients if said difference is higher than a threshold amount and selecting said second set of pixel duplication coefficients if said difference is lower than a threshold amount; and applying said selected set of scaling coefficients through said scaling block to generate conditionally scaled output pixel value.

29. The method of claim 28, wherein said selecting step comprises selecting a first set of scaling coefficients if said condition is met, and selecting a second set of scaling coefficients if said condition is not met.

30. The method of claim 29, wherein said condition is whether a difference between a currently processed pixel value and a vertically adjacent pixel value in a first previous line to said currently processed pixel value is greater than a predetermined amount, wherein said first set of scaling coefficients passes said currently processed pixel value without scaling, and wherein said second set of scaling coefficient generates a weighted average of said currently processed pixel value and said vertically adjacent pixel value.

31. The method of claim 28, further comprising generating an output control signal for each line of pixel values to identify valid and invalid lines.

32. A method for scaling image data to a desired output resolution, comprising:

receiving pixel values from an image;

providing a scaling block having at least two sets of selectable scaling coefficients;

analyzing said pixel values;

selecting one of said sets of selectable scaling coefficients for said scaling block depending upon a condition related to said pixel values; and applying said selected set of scaling coefficients through said scaling block to generate a conditionally scaled output value; and generating an output control signal for each line of pixel values to identify valid and invalid lines;

wherein said generating step includes identifying even frames in odd lines and odd frames in even lines as invalid as an interlacing mechanism.

33. A graphics processing system for use in converting computer formatted images into television formatted images, comprising:

an input interface having computer graphics data as an input;

conditional scaling circuitry coupled to said input interface to receive said computer graphics data and having conditionally scaled image data as an output, said conditional scaling circuitry having a conditionally applied scaling value dependent upon adjacent pixel values within an image;

an adaptive flicker reduction filter having said conditionally scaled image data as an input and flicker reduced image data as an output, said flicker reduction filter having at least two sets of selectable filter parameters dependent upon conditions related to values of vertically and horizontally adjacent pixel values;

a rate converter having said flicker reduced image data as an input and having line rate adjusted data as an output, said line rate adjusted data being substantially compatible with a line rate for a desired television format; and a television output interface having said line rate adjusted data as an input and having television output data as an output, said television output data being substantially compatible with said desired television format.

34. The graphics processing system of claim 33, wherein said computer graphics data is a progressive scan format and said desired television format is an interlaced format.

35. The graphics processing system of claim 33, wherein said computer graphics data is a RGB computer graphics format.

36. The graphics processing system of claim 35, further comprising a RGB to YCbCr converter having said computer graphics data in said RGB computer graphics format as an input and having YCbCr data as an output.

37. A personal computer system providing an image output compatible with a television format, comprising:

a central processing unit, a memory, an input device, and a storage device connected to each other through an internal bus; and a graphics processing system connected to said internal bus converting non-interlaced computer graphics data to a desired interlaced television format, said graphics processing system including:

conditional scaling circuitry conditionally applying a scaling value dependent upon conditions related to pixel values within an image, and adaptive flicker reduction circuitry applying one set of at least two selectable sets of filter parameters dependent upon two-dimensional conditions related to pixel values within said image.

38. A method for converting computer formatted images into television formatted images for graphics processing, comprising:

receiving computer graphics data representative of an image;

applying a scaling factor to said computer graphics data conditioned upon adjacent pixel values within said image;

applying a flicker reduction filter to said computer graphics data with filter parameters dependent upon values of vertically and horizontally adjacent pixel values within said image; and outputting converted image data in said desired television format.

* * * * *